US009460137B2

(12) United States Patent
Amigud et al.

(10) Patent No.: US 9,460,137 B2
(45) Date of Patent: *Oct. 4, 2016

(54) HANDLING AN INCREASE IN TRANSACTIONAL DATA WITHOUT REQUIRING RELOCATION OF PREEXISTING DATA BETWEEN SHARDS

(71) Applicant: International Business Machines Corporation, Armonk, NY (US)

(72) Inventors: Eugene Amigud, Northborough, MA (US); Bhuvan Ananthanarayanan, Acton, MA (US); Adam Elliott, Milford, NH (US); Ninad R. Manelkar, Manchester, NH (US); Leho Nigul, Richmond Hill (CA); Sanjeev Siotia, Southborough, MA (US)

(73) Assignee: International Business Machines Corporation, Armonk, NY (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/256,062

(22) Filed: Apr. 18, 2014

(65) Prior Publication Data

US 2015/0302046 A1 Oct. 22, 2015

(51) Int. Cl.
*G06F 17/30* (2006.01)
(52) U.S. Cl.
CPC .............................. *G06F 17/30339* (2013.01)
(58) Field of Classification Search
USPC ................ 707/747, 769, 759, 745, 737, 756
See application file for complete search history.

(56) References Cited

U.S. PATENT DOCUMENTS

| 8,429,162 B1 | 4/2013 | Wang et al. |
| 2012/0173541 A1* | 7/2012 | Venkataramani ... G06F 17/3048 707/747 |
| 2013/0311426 A1 | 11/2013 | Erdogan et al. |
| 2014/0108421 A1* | 4/2014 | Isaacson ........... G06F 17/30575 707/747 |
| 2015/0302046 A1 | 10/2015 | Amigud et al. |
| 2015/0302047 A1* | 10/2015 | Amigud ............ G06F 17/30377 707/700 |

OTHER PUBLICATIONS

List of IBM Patents or Patent Applications Treated as Related, 2015, pp. 1-2.
Office Action for U.S Appl. No. 14/607,320 dated Feb. 1, 2016, pp. 1-17.

* cited by examiner

*Primary Examiner* — Hung T Vy
(74) *Attorney, Agent, or Firm* — Robert A. Voigt, Jr.; Winstead, P.C.

(57) ABSTRACT

A method, system and computer program product for handling an increase in transactional data load without requiring the relocation of preexisting data. A range of attribute values and identifications of associated shards are stored in a data structure. In response to adding a new shard, the data structure is updated by associating a range of attribute values to the added shard while maintaining the same range of attribute values being associated with one of the pre-existing shards. As a result, the new data assigned within this range of attribute values will be stored in the newly added shard while the older data assigned within this range of attribute values will continue to be stored in one of the preexisting shards. In this manner, an increase in transactional data load can be handled by adding a new shard without requiring the relocation of preexisting data.

10 Claims, 7 Drawing Sheets

HANDLING AN INCREASE IN TRANSACTIONAL DATA WITHOUT REQUIRING RELOCATION OF PREEXISTING DATA BETWEEN SHARDS

TECHNICAL FIELD

The present invention relates generally to data partitioning, and more particularly to handling an increase in transactional data without requiring relocation of preexisting data between shards.

BACKGROUND

Data may be partitioned between multiple data sources, such as a "shard." In such an architecture, the data to be stored in the shards is assigned an identifier, such as a customer's e-mail address or store number. A range of identifier values is then mapped to a specific shard. When data is created, it is placed in a corresponding shard based on its assigned identifier value. For example, data for the first 100 stores of a customer is to be stored in one shard, data for the second 100 stores of the customer is to be stored in another shard and so forth.

As the volume of data to be stored increases though, there will be a need to add additional shards. However, by adding additional shards, this presents a problem of how to relocate existing data from existing shards to the new ones. For instance, referring to the above example, instead of having data for stores 1-100 being stored in a single shard (e.g., shard #1), data for stores 1-50 may be stored in shard #1, whereas, data for stores 51-100 may be stored in a new shard (e.g., shard #2). As a result, existing data needs to be moved from one shard into another shard, such as moving data for stores 51-100 stored in shard #1 into shard #2. Although database replication software exists to move data from one shard into another shard, it requires significant computational resources to move the data, such as moving hundreds of millions of orders in an online transaction processing environment. Furthermore, the shared data and the applications which access such shared data may contain the old shard's database information, which now has to be updated for every single record that is moved.

BRIEF SUMMARY

In one embodiment of the present invention, a method for handling an increase in transactional data load without requiring relocation of preexisting data comprises storing one or more ranges of attributes values and one or more identifications of shards in a data structure, where each of the one or more shards is associated with a range of attribute values. Furthermore, each of the one or more shards stores data with an attribute value within its associated range of attribute values. The method further comprises adding a new shard to one or more preexisting shards to handle additional data to be stored. Additionally, the method comprises updating, by a processor, the data structure by associating a first range of attribute values to the new shard while maintaining the first range of attribute values being associated to one of the one or more preexisting shards.

Other forms of the embodiment of the method described above are in a system and in a computer program product.

The foregoing has outlined rather generally the features and technical advantages of one or more embodiments of the present invention in order that the detailed description of the present invention that follows may be better understood.

Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for handling an increase in transactional data load without requiring the relocation of preexisting data. In one embodiment of the present invention, a range of attribute values and identifications of associated shards are stored in a data structure. An attribute value, as used herein, refers to a value assigned to data that is stored in a particular shard. Each shard is associated with a range of attribute values and stores data assigned with an attribute value within this range of attribute values. A new shard is added to handle additional data to be stored (i.e., handle the increase in transactional data load). In response to adding a shard, the data structure is updated by associating a range of attribute values to the added shard while maintaining the same range of attribute values being associated with one of the pre-existing shards (referring to those shards that existed prior to adding the new shard). As a result, the new data assigned within this range of attribute values will be stored in the newly added shard while the older data (referring to the data previously stored prior to adding the new shard) assigned within this range of attribute values will continue to be stored in one of the preexisting shards. In this manner, an increase in transactional data load can be handled by adding a new shard without requiring the relocation of preexisting data.

While the following discusses the present invention in connection with adding a new shard in a database system without requiring the relocation of preexisting data, the principles of the present invention may be applied to any system (e.g., file system) storing data, where the data is stored among multiple shards. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
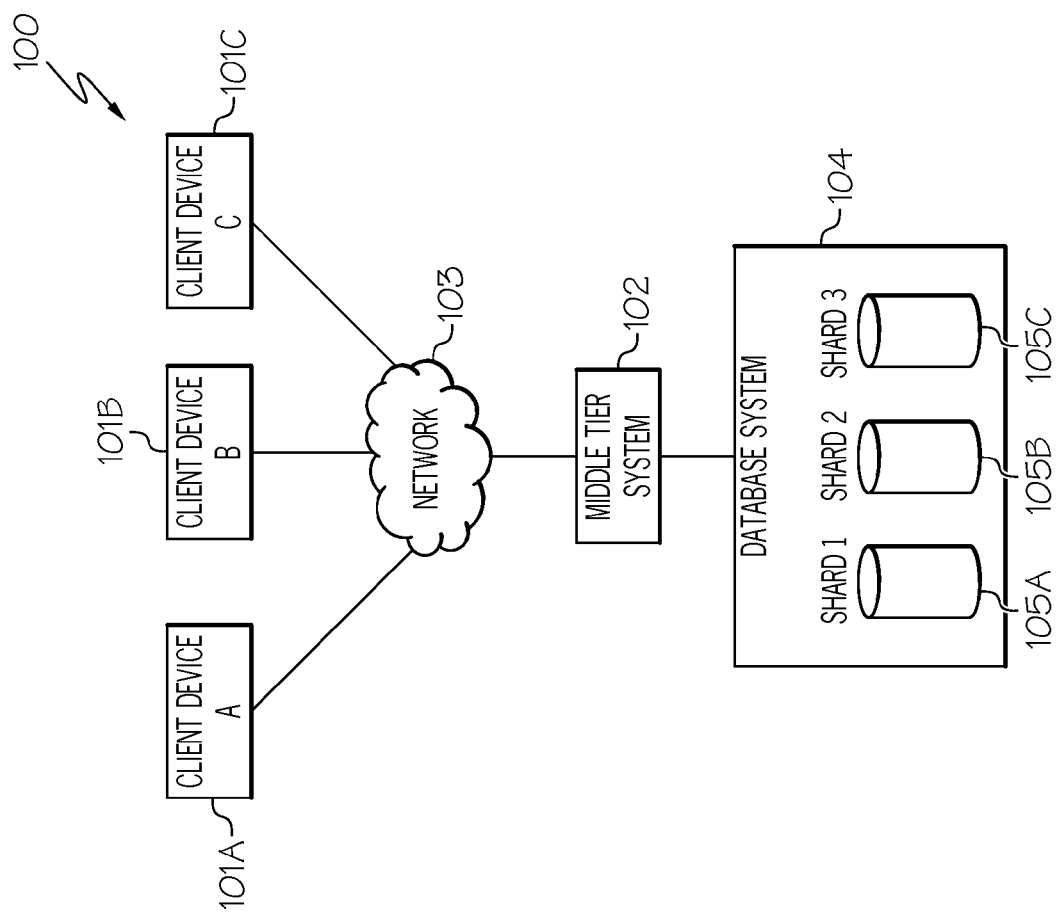
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes client devices 101A-101C (identified as "Client Device A," "Client Device B," and "Client Device C," respectively, in FIG. 1) connected to a middle tier system 102 via a network 103. Client devices 101A-101C may collectively or individually be referred to as client devices 101 or client device 101, respectively. Client device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 103 and consequently communicating with database system 104 as discussed below.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Network system 100 further includes a database system 104 connected to middle tier system 102. While middle tier system 102 is shown to be directly connected to database system 104, middle tier system 102 may be connected to database system 104 via a network (not shown), similar to network 103. Database system 104 contains one or more shards 105A-105C (identified as "Shard 1," "Shard 2," and "Shard 3," respectively, in FIG. 1). Shards 105A-105C may collectively or individually be referred to as shards 105 or shard 105, respectively. In one embodiment, shard 105 is a partition in the database and may reside on a separate database server (not shown) or physical location within database system 104. While FIG. 1 illustrates database system 104 containing three shards 105, database system 104 may contain any number of shards 105.

Users of client devices 101 generate requests for service to middle tier system 102, at least some of these requests requiring access to information in shards 105 of database system 104. Middle tier system 102 acts as a server to client device 101; it may provide various services to client devices 101 (not all of which necessarily involve database access), but in particular it functions as an intermediary between client devices 101 and database system 104 in handling client requests to access information in shard 105. Where necessary to provide a requested service, middle tier system 102 uses the client request for information in a general form to generate one or more requests to database system 104 in a specific form required by shard 105 to be accessed. Database system 104 generates responses to those requests (e.g., copies of selective information, results of queries, acknowledgments of changes made to the information, etc.), which are transmitted to middle tier system 102, and used by middle tier system 102 to provide a response to client devices 101. Middle tier system 102, which handles all direct interaction with client devices 101, appears to client devices 101 as database system 104. From the perspective of database system 104, middle tier system 102 functions as a representative of multiple client devices 101 to transmit and receive information from client devices 101. A description of an embodiment of a hardware configuration of middle tier system 102 is provided below in connection with FIG. 2.

FIG. 1 is intended to represent a typical environment at a high level of generality, and is not intended to represent all components of an environment in detail, or all possible permutations of an environment for accessing a database. Numerous variations of the environmental representation of FIG. 1 are possible, of which the following in particular are possible, the description of particular variations herein being intended by way of example only and not by way of limitation. For example, embodiments of the present invention discussed herein may be implemented in several environments, including a cloud environment. Furthermore, although client devices 101, middle tier system 102 and database system 104 are shown as separate and distinct entities, some or all of these may in fact be combined.

Figure 2:
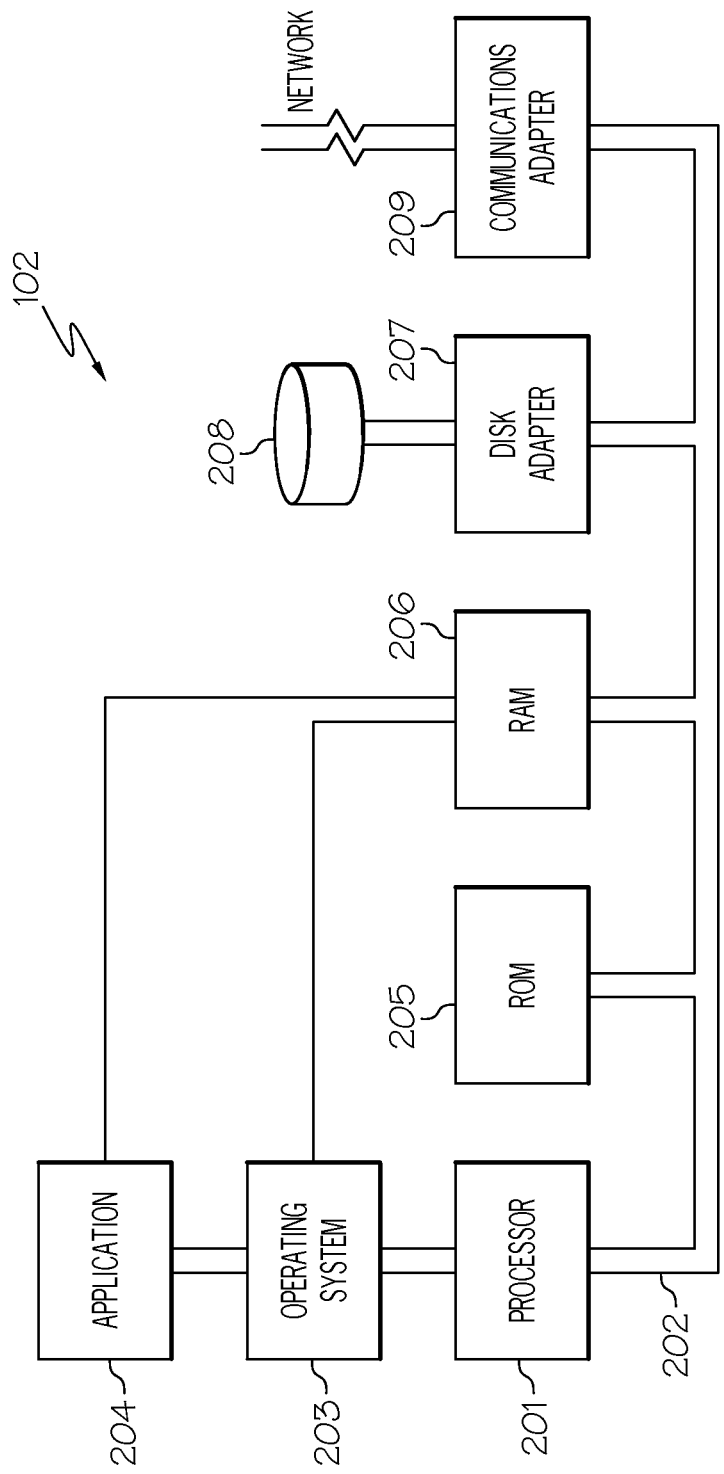
FIG. 2 illustrates a hardware configuration of a middle tier system in accordance with an embodiment of the present invention.

Referring now to FIG. 2, FIG. 2 illustrates a hardware configuration of middle tier system 102 (FIG. 1) which is representative of a hardware environment for practicing the present invention. Referring to FIG. 2, middle tier system 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for handling an increase in transactional data load without requiring the relocation of preexisting data as discussed further below in association with FIGS. 3-7.

Referring again to FIG. 2, read-only memory ("ROM") 205 is coupled to system bus 202 and includes a basic input/output system ("BIOS") that controls certain basic functions of middle tier system 102. Random access memory ("RAM") 206 and disk adapter 207 are also coupled to system bus 202. It should be noted that software components including operating system 203 and application 204 may be loaded into RAM 206, which may be middle tier system's 102 main memory for execution. Disk adapter 207 may be an integrated drive electronics ("IDE") adapter that communicates with a disk unit 208, e.g., disk drive. It is noted that the program for handling an increase in transactional data load without requiring the relocation of preexisting data, as discussed further below in association with FIGS. 3-7, may reside in disk unit 208 or in application 204.

Middle tier system 102 may further include a communications adapter 209 coupled to bus 202. Communications adapter 209 interconnects bus 202 with an outside network (e.g., network 103 of FIG. 1) thereby enabling middle tier system 102 to communicate with client devices 101 and database system 104.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, data may be partitioned between multiple data sources, such as a "shard." In such an architecture, the data to be stored in the shards is assigned an identifier, such as a customer's e-mail address or store number. A range of identifier values is then mapped to a specific shard. When data is created, it is placed in a corresponding shard based on its assigned identifier value. For example, data for the first 100 stores of a customer is to be stored in one shard, data for the second 100 stores of the customer is to be stored in another shard and so forth. As the volume of data to be stored increases though, there will be a need to add additional shards. However, by adding additional shards, this presents a problem of how to relocate existing data from existing shards to the new ones. For instance, referring to the above example, instead of having data for stores 1-100 being stored in a single shard (e.g., shard #1), data for stores 1-50 may be stored in shard #1, whereas, data for stores 51-100 may be stored in a new shard (e.g., shard #2). As a result, existing data needs to be moved from one shard into another shard, such as moving data for stores 51-100 stored in shard #1 into shard #2. Although database replication software exists to move data from one shard into another shard, it requires significant computational resources to move the data, such as moving hundreds of millions of orders in an online transaction processing environment. Furthermore, the shared data and the applications which access such shared data may contain the old shard's database information, which now has to be updated for every single record that is moved.

Figure 3:
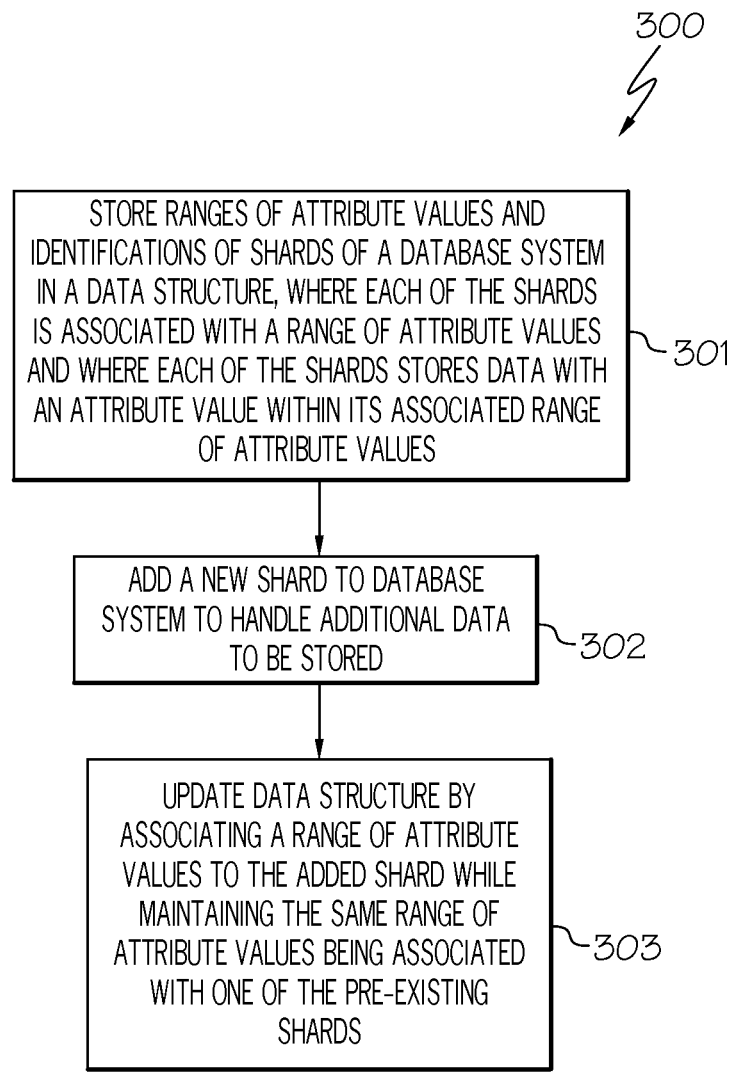
FIG. 3 is a flowchart of a method for handling an increase in transactional data load, such as by adding a new shard, without requiring the relocation of preexisting data in accordance with an embodiment of the present invention.
Figure 4:
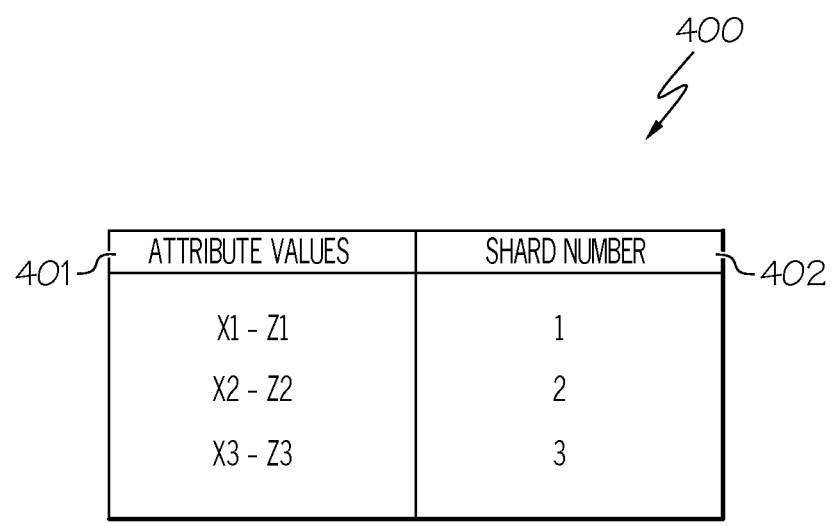
FIG. 4 illustrates a data structure configured to store ranges of attributes values and associated identifications of shards prior to adding a new shard in accordance with an embodiment of the present invention.
Figure 5:
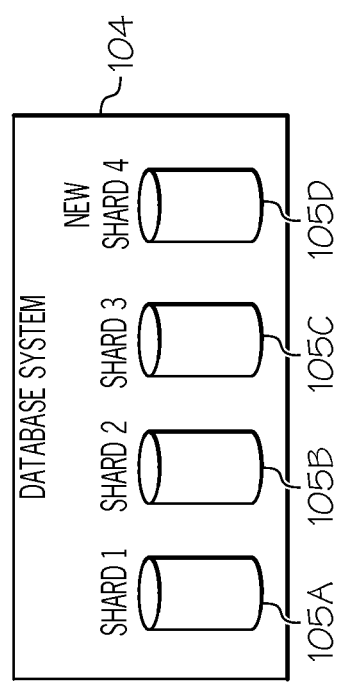
FIG. 5 illustrates a new shard being added to the database system in accordance with an embodiment of the present invention.
Figure 6:
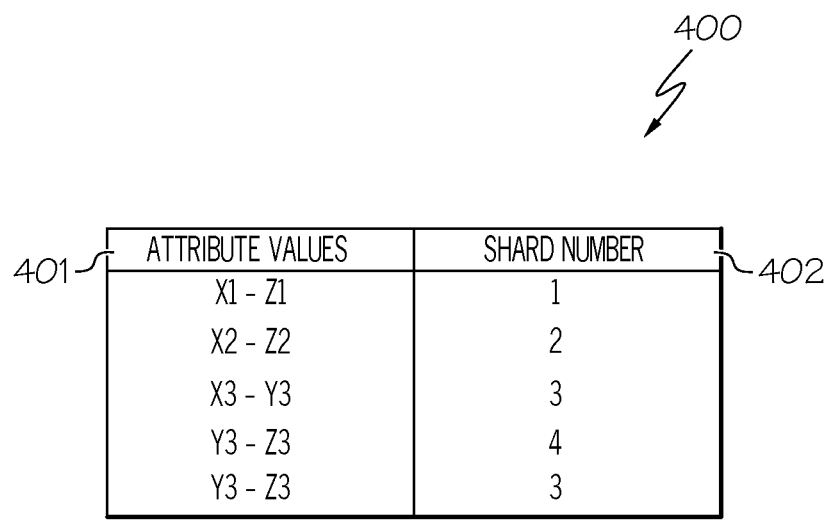
FIG. 6 illustrates the data structure being updated to associate a range of attribute values to the newly added shard while maintaining the association of the same range of attribute values to a preexisting shard in accordance with an embodiment of the present invention.
Figure 7:
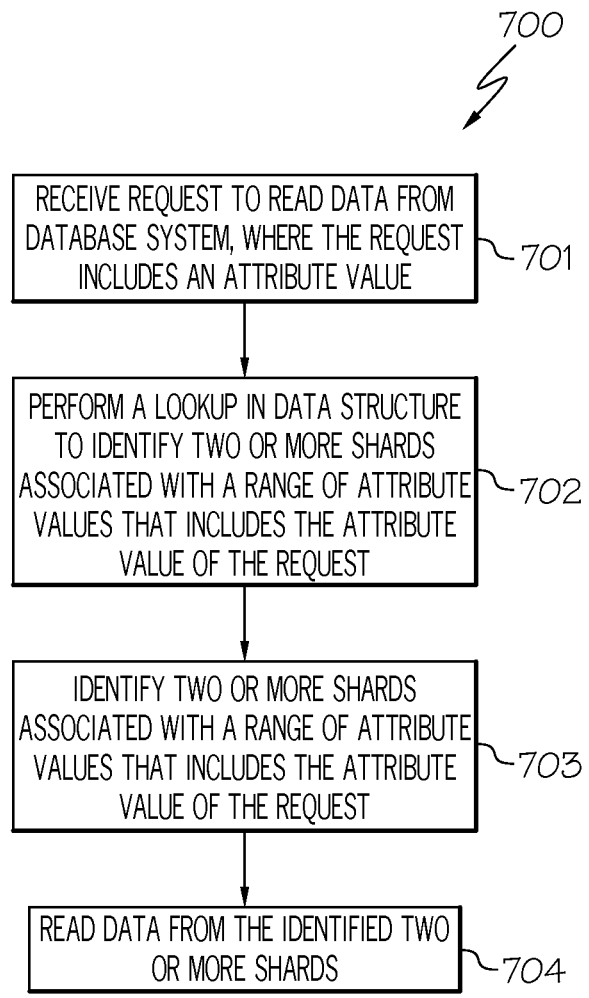
FIG. 7 is a flowchart of a method for accessing data stored in multiple shards in accordance with an embodiment of the present invention.

The principles of the present invention provide a means for handling an increase in transactional data load, such as by adding a new shard, without requiring the relocation of preexisting data as discussed further below in connection with FIGS. 3-7. FIG. 3 is a flowchart of a method for handling an increase in transactional data load, such as by adding a new shard, without requiring the relocation of preexisting data. FIG. 4 illustrates a data structure configured to store ranges of attributes values and associated identifications of shards prior to adding a new shard. FIG. 5 illustrates a new shard being added to the database system. FIG. 6 illustrates the data structure being updated to associate a range of attribute values to the newly added shard while maintaining the association of the same range of attribute values to a preexisting shard. FIG. 7 is a flowchart of a method for accessing data stored in multiple shards using the data structure of the present invention.

As stated above, FIG. 3 is a flowchart of a method 300 for handling an increase in transactional data load, such as by adding a new shard, without requiring the relocation of preexisting data in accordance with an embodiment of the present invention.

Referring to FIG. 3, in conjunction with FIGS. 1-2, in step 301, middle tier system 102 stores ranges of attribute values and identifications of associated shards 105 of database system 104 in a data structure as illustrated in FIG. 4. FIG. 4 illustrates a data structure 400 configured to store ranges of attributes values and associated identifications of shards 105 prior to adding a new shard in accordance with an embodiment of the present invention.

As illustrated in FIG. 4, data structure 400 includes a listing of ranges of attribute values 401 and the associated identifications of shards (shard numbers) 402. An attribute value, as used herein, refers to a value assigned to data that is stored in a particular shard 105. For example, the range of attribute values X1-Z1 is associated with the identification of shard #1 (e.g., shard 105A of FIG. 1), the range of attribute values X2-Z2 is associated with the identification of shard #2 (e.g., shard 105B of FIG. 1) and the range of attribute values X3-Z3 is associated with the identification of shard #3 (e.g., shard 105C of FIG. 1). Hence, as illustrated in FIG. 4, each shard 105 is associated with a range of attribute values. Furthermore, each shard 105 stores data with an attribute value within its associated range of attribute values. For example, data with an attribute value within the range of attribute values X1-Z1 would be stored in shard 105 associated with the identification of shard #1 (e.g., shard 105A). In one embodiment, data structure 400 resides in memory (e.g., ROM 205) or in a storage medium (e.g., disk unit 208).

Returning to FIG. 3, in conjunction with FIGS. 1-2 and 4, in step 302, middle tier system 102 adds a new shard 105 to handle additional data to be stored (i.e., handle the increase in transactional data load) as illustrate in FIG. 5. FIG. 5 illustrates a new shard 105D being added to database system 104 in accordance with an embodiment of the present invention.

Referring to FIG. 5, shard 105D (identified as "New Shard 4") is added to database system 104 containing preexisting shards 105A-105C to handle the additional transactional data load. New shard 105D and preexisting shards 105A-105C may collectively or individually be referred to as shards 105 or shard 105, respectively. In one embodiment, shard 105D is added to store new data assigned to a range of attribute values while the older data assigned to the same range of attribute values is to be maintained in the preexisting shard(s) 105 as discussed further below.

Returning to FIG. 3, in conjunction with FIGS. 1-2 and 4-5, in step 303, middle tier system 102, in response to having a shard 105 (e. g., shard 105D) added to database system 104, updates data structure 400 by associating a range of attribute values to the added shard 105D while maintaining the same range of attribute values being associated with one of the pre-existing shards 105 (referring to those shards 105, such as shards 105A-105C, that existed prior to adding the new shard, such as 105D) as illustrated in FIG. 6. FIG. 6 illustrates data structure 400 being updated to associate a range of attribute values to the newly added shard 105D while maintaining the association of the same range of attribute values to a preexisting shard 105 (e.g., shard 105C) in accordance with an embodiment of the present invention.

Referring to FIG. 6, in conjunction with FIG. 5, data structure 400 has been updated to reflect that new data assigned within the range of attribute values Y3-Z3 will be stored in shard 105 associated with the identification of shard #4 (e.g., shard 105D). Furthermore, data structure 400 has been updated to reflect that the older data (referring to the data previously stored prior to the new shard 105, such as shard 105D, being added to database system 104) assigned within the range of attribute values Y3-Z3 will be stored in shard 105 associated with the identification of shard #3 (e.g., shard 105C). In one embodiment, the mapping of the range of attribute values assigned to the older data, such as Y3-Z3, to one of the preexisting shards 105, such as shard 105C, is maintained by metadata.

An example of utilizing the principles of the present invention to handle an increase in transactional data load, such as by adding a new shard, without requiring the relocation of preexisting data is as follows. Suppose that a website starts with 200 electronic stores split across two shards 105 with 100 stores in each shard 105 (e.g., data from stores 1-100 stored in shard 105A and data from stores 101-200 stored in shard 105B). All orders for the first 100 stores are stored in shard 105A while the orders for stores 101-200 are stored in shard 105B. As business grew and volumes of data to be stored increased, there was a need to add a new shard 105, such as shard 105D, to store the new data. For instance, the data to be stored from the first 100 stores (stores 1-100) may be split into two shards 105, which each storing data from 50 of the first 100 stores. The new data from stores 1-50 may now be stored in the newly added shard 105D. However, there is still a need to retrieve the orders that had previously transpired. As a result, some of the orders will reside in preexisting shard 105A while some will reside in newly added shard 105D. In order to retrieve these orders, a metadata engine, which may reside in application 204, is configured to maintain a mapping of historically assigned shards 105, such as in this case shard 105A. All new orders will be created in the newly added shard 104, however, the older orders can still be retrieved from shard 105A. In this manner, an increase in transactional data load can be handled by adding a new shard 105 (e.g., shard 105D) without requiring the relocation of preexisting data.

As will be discussed in further detail below, middle tier system 102 will retrieve data from multiple shards 105 (e.g., shards 105C and 105D) in situations when the requested data is assigned an attribute value that is within a range of attribute values associated with multiple shards 105. By having the old and new data being assigned a range of attribute values associated with multiple shards 105 (a new shard 105D and a preexisting shard 105, such as shard 105C), relocation of preexisting data is no longer required.

Data can be accessed from multiple shards 105, such as a new shard 105 (e.g., shard 105D) and a preexisting shard 105, such as shard 105C, as discussed below in connection with FIG. 7.

FIG. 7 is a flowchart of a method 700 for accessing data stored in multiple shards 105 (e.g., shards 105C, 105D) using data structure 400 of the present invention in accordance with an embodiment of the present invention.

Referring to FIG. 7, in conjunction with FIGS. 1-6, in step 701, middle tier system 102 receives a request from client device 101 (e.g., client device 101A) to read data from database system 104, where the request includes an attribute value assigned to the data to be read. In one embodiment, a services layer of middle tier system 102 receives the request from client device 101. In one embodiment, such a services layer is one of the layers in the service oriented architecture. In one embodiment, the services layer is a collection of application programming interfaces.

In step 702, middle tier system 102 performs a look-up in data structure 400 to identify two or more shards 105 associated with a range of attribute values that include the attribute value of the request.

In step 703, middle tier system 102 identifies two or more shards 105 associated with a range of attribute values that includes the attribute value of the request. For example, referring to FIG. 6, if the request received in step 701 was associated with an attribute value of Y3, then middle tier system 102 would identify shard #4 (e.g., shard 105D) storing the new data and shard #3 (e.g., shard 105C) storing the older data assigned to an attribute value of Y3.

In step 704, middle tier system 102 reads the requested data from the identified two or more shards 105 (e.g., shards 105C, 105D). In one embodiment, the data read is aggregated into a single response to be sent to the requesting client device 101. In one embodiment, the read data is aggregated at the application level as opposed to the database level.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for handling an increase in transactional data load without requiring relocation of preexisting data, the computer program product comprising a computer readable storage medium having program code embodied therewith, the program code comprising the programming instructions for:

storing one or more ranges of attributes values and one or more identifications of shards in a data structure, wherein each of said one or more shards is associated with a range of attribute values, wherein each of said one or more shards stores data with an attribute value within its associated range of attribute values;

adding a new shard to one or more preexisting shards to handle additional data to be stored;

updating said data structure by associating a first range of attribute values to said new shard while maintaining said first range of attribute values being associated to one of said one or more preexisting shards;

receiving a request to read data, wherein said request comprises an attribute value;

performing a lookup in said data structure to identify two or more shards associated with a range of attribute values comprising said attribute value of said request;

identifying two or more shards associated with said range of attribute values comprising said attribute value of said request in response to performing said lookup in said data structure; and reading data from said identified two or more shards.

2. The computer program product as recited in claim 1, wherein the program code further comprises the programming instructions for:

aggregating said data read from said identified two or more shards into a single response.

3. The computer program product as recited in claim 1, wherein one of said two or more identified shards corresponds to said new shard storing newer data than said one or more preexisting shards, wherein one of said two or more identified shards corresponds to one of said one or more preexisting shards storing older data than said new shard.

4. The computer program product as recited in claim 1, wherein said request is received by a services layer of a database system, wherein said services layer is a collection of application programming interfaces.

5. The computer program product as recited in claim 1, wherein a mapping of said first range of attribute values to one of said one or more preexisting shards is maintained by metadata.

6. A system, comprising:

a memory unit for storing a computer program for handling an increase in transactional data load without requiring relocation of preexisting data; and a processor coupled to the memory unit, wherein the processor is configured to execute the program instructions of the computer program comprising:

storing one or more ranges of attributes values and one or more identifications of shards in a data structure, wherein each of said one or more shards is associated with a range of attribute values, wherein each of said one or more shards stores data with an attribute value within its associated range of attribute values;

adding a new shard to one or more preexisting shards to handle additional data to be stored;

updating said data structure by associating a first range of attribute values to said new shard while maintaining said first range of attribute values being associated to one of said one or more preexisting shards;

receiving a request to read data, wherein said request comprises an attribute value;

performing a lookup in said data structure to identify two or more shards associated with a range of attribute values comprising said attribute value of said request;

identifying two or more shards associated with said range of attribute values comprising said attribute value of said request in response to performing said lookup in said data structure; and reading data from said identified two or more shards.

7. The system as recited in claim 6, wherein the program instructions of the computer program further comprises:

aggregating said data read from said identified two or more shards into a single response.

8. The system as recited in claim 6, wherein one of said two or more identified shards corresponds to said new shard storing newer data than said one or more preexisting shards, wherein one of said two or more identified shards corresponds to one of said one or more preexisting shards storing older data than said new shard.

9. The system as recited in claim 6, wherein said request is received by a services layer of a database system, wherein said services layer is a collection of application programming interfaces.

10. The system as recited in claim 6, wherein a mapping of said first range of attribute values to one of said one or more preexisting shards is maintained by metadata.

* * * * *